United States Patent [19]

Patin

[11] 4,368,796

[45] Jan. 18, 1983

[54] APPARATUS FOR THE OPERATION AND CONTROL OF THE TILT OF THE BODY OF A VEHICLE

[76] Inventor: Pierre Patin, 16 boulevard de l'Hopital, 75005 Paris, France

[21] Appl. No.: 174,522

[22] PCT Filed: Mar. 1, 1979

[86] PCT No.: PCT/FR79/00019

§ 371 Date: Oct. 24, 1979

§ 102(e) Date: Oct. 24, 1979

[87] PCT Pub. No.: WO79/00686

PCT Pub. Date: Sep. 20, 1979

[30] Foreign Application Priority Data

Mar. 2, 1978 [FR] France ................. 78 05978

[51] Int. Cl.³ .......................................... B62D 61/08
[52] U.S. Cl. ..................................... 180/215; 180/41
[58] Field of Search ................. 180/41, 215; 280/111, 280/112 R, 112 A, 6 R, 6.11, 6.1; 105/164, 199 A

[56] References Cited

U.S. PATENT DOCUMENTS

| | | | |
|---|---|---|---|
| 1,262,829 | 4/1918 | Neumeier | 280/6.1 |
| 1,574,691 | 2/1926 | Ragsdale | 180/41 X |
| 1,821,271 | 9/1931 | Musgrove | 280/6.1 |
| 2,417,526 | 3/1947 | Steins et al. | 105/164 |
| 2,815,960 | 12/1957 | Zapelloni | 280/112 A |
| 2,819,093 | 1/1958 | Geiser | 280/112 A |
| 3,601,213 | 8/1971 | Patin | 180/215 |
| 3,698,502 | 10/1972 | Patin | 280/282 |
| 3,781,031 | 12/1973 | Patin | 280/62 |
| 3,964,563 | 2/1976 | Allen | 180/41 |
| 4,006,916 | 2/1977 | Patin | 180/215 |

FOREIGN PATENT DOCUMENTS

| | | |
|---|---|---|
| 496016 | 9/1950 | Belgium . |
| 1146381 | 3/1963 | Fed. Rep. of Germany . |
| 1562248 | 2/1969 | France . |
| 2031813 | 11/1970 | France . |
| 2154972 | 4/1973 | France . |
| 2277261 | 1/1976 | France . |

*Primary Examiner*—John A. Pekar
*Attorney, Agent, or Firm*—Pollock, Vande Sande & Priddy

[57] ABSTRACT

The device in accordance with the invention operates and controls the tilt of a body of a vehicle and is operated by a driving shaft driven in rotation by movement of the vehicle. A rocking mechanism that is capable of being driven in two opposite directions by the driving shaft employs two disengageable coupling assemblies to operate rocking of the body, each in one direction. Progressive engagement of one or other of the coupling assemblies is operated directly by a pendular mass. Deviation of the latter to one side or the other of a plane passing through its axis of oscillation and parallel with the median plane of the body, causes progressive engagement of that one of the two coupling assemblies. This causes rocking of the body in a direction which enables the median plane of the latter to be brought back into the direction of the apparent vertical passing through the axis of oscillation and the center of gravity of the pendular mass.

13 Claims, 8 Drawing Figures

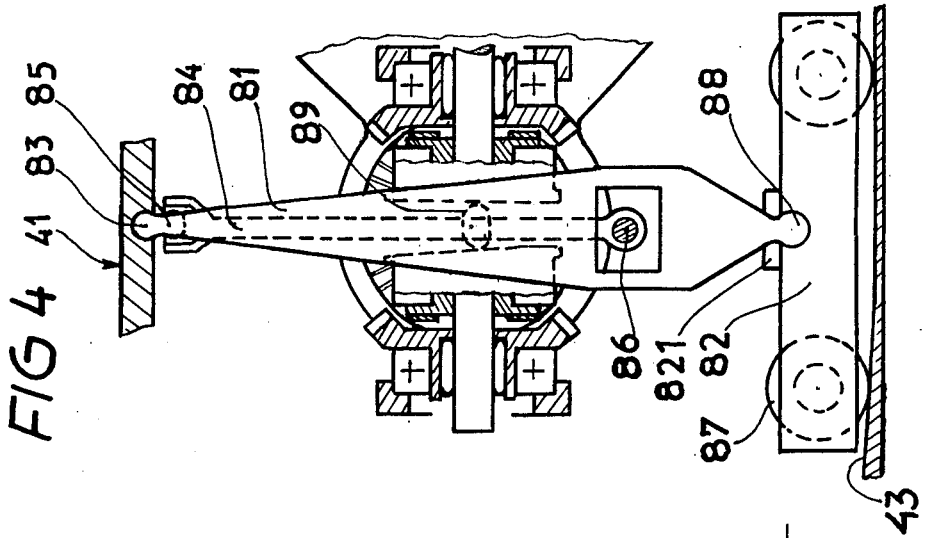
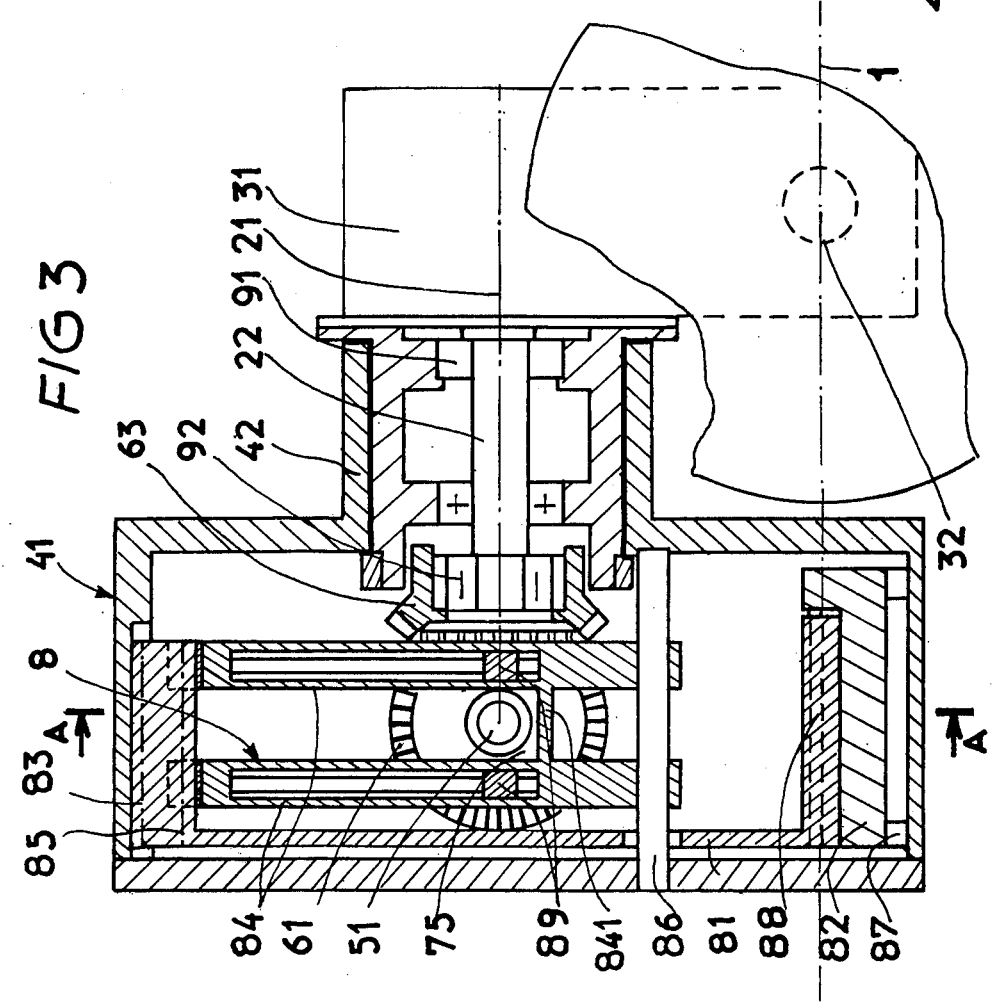

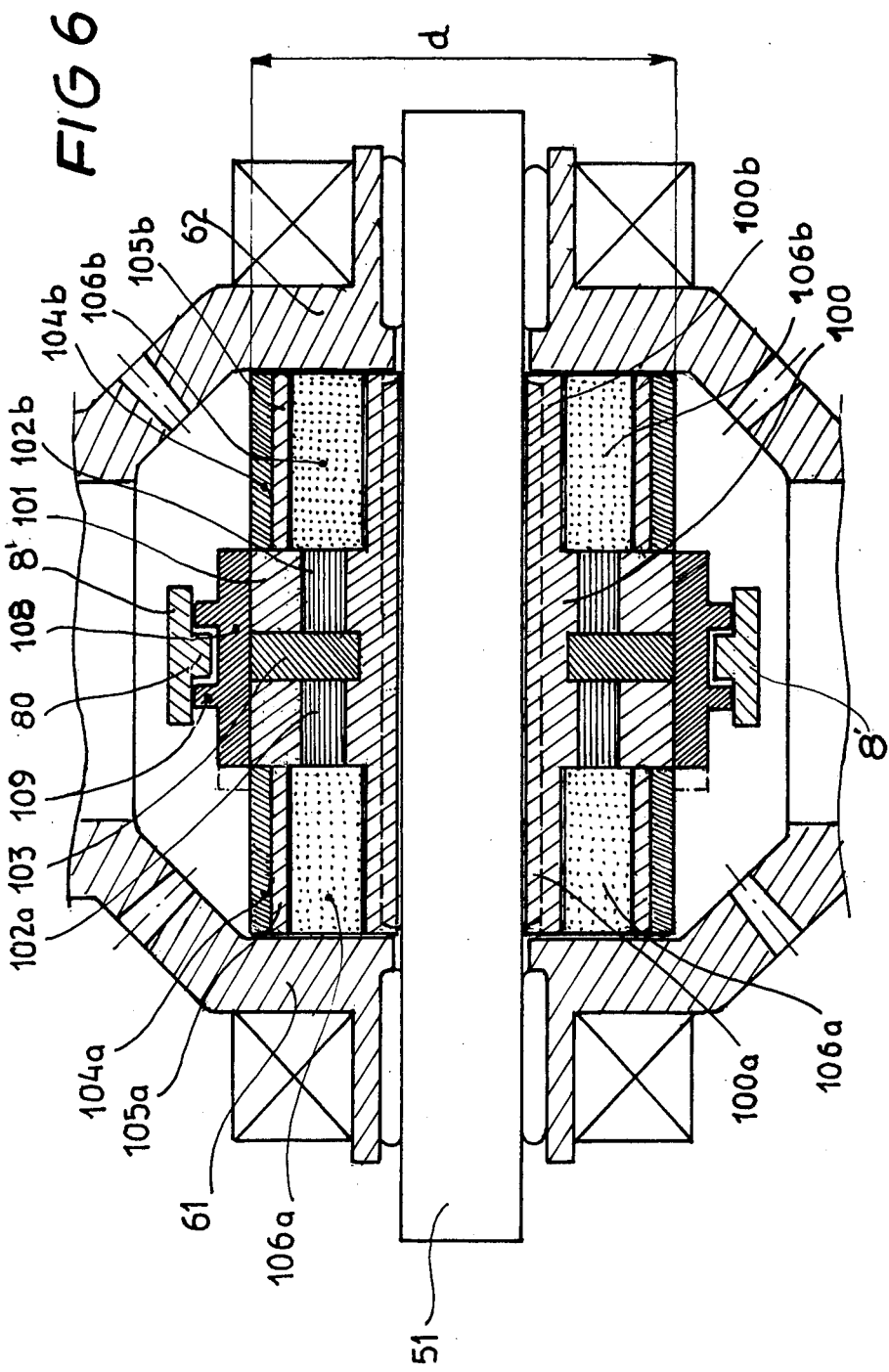

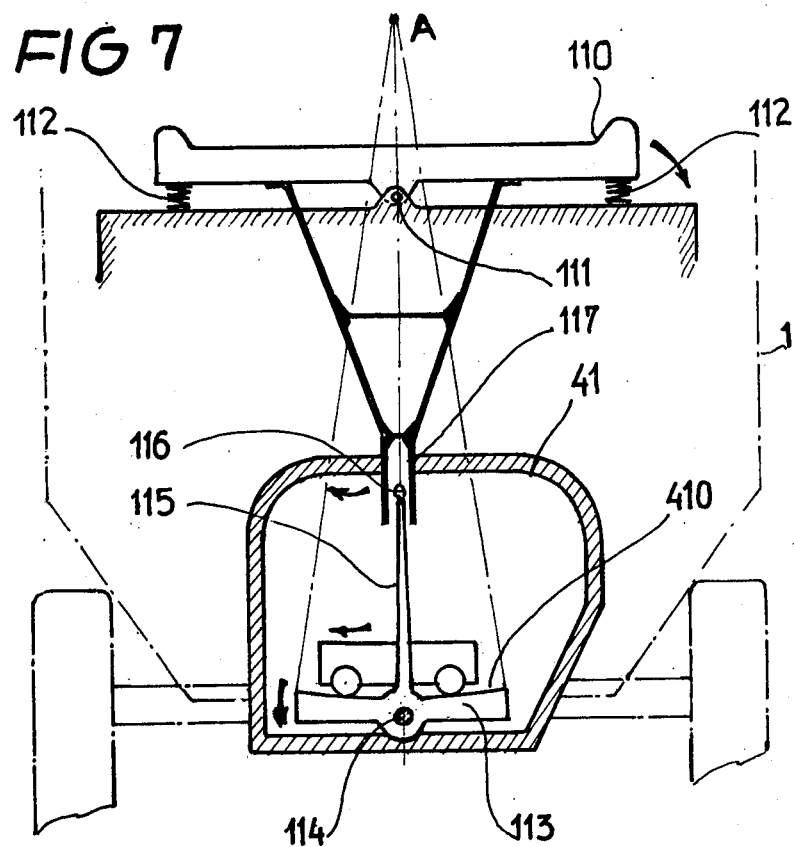
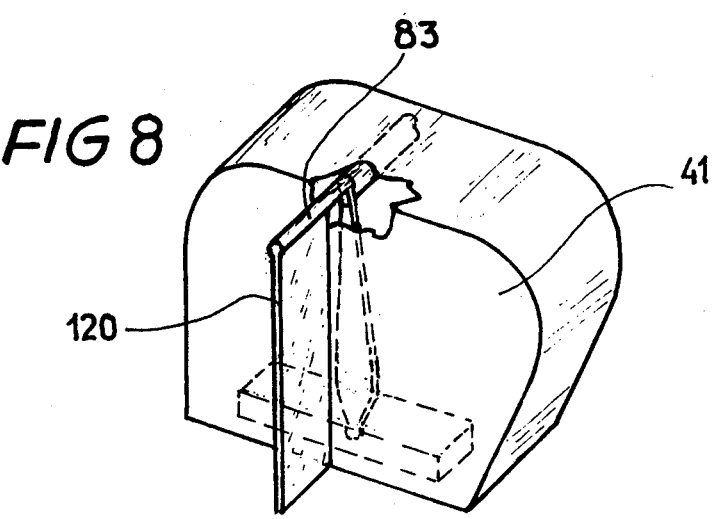

APPARATUS FOR THE OPERATION AND CONTROL OF THE TILT OF THE BODY OF A VEHICLE

FIELD OF THE INVENTION

The object of the invention is a device for operation and control of the tilt of the body of a vehicle mounted upon at least one set of running wheels upon which the body is articulated about a substantially horizontal axis located in its median plane.

BACKGROUND

The invention is applicable especially but non-restrictively to light three-wheeled vehicles of the type described in U.S. Pat. No. 3,698,502 filed by the same inventor.

In this patent a three-wheeled vehicle is described including a front wheel for steering and a back axle onto which is articulated the body of the vehicle so that the latter can tilt to one side or the other of the plane of symmetry of the axle. Thanks to this arrangement the vehicle is stable at standstill, the articulation being then blocked, which enables it to have a body for protecting the driver. But when running, the articulation is unblocked so that the vehicle can behave like a two-wheeled vehicle which enables the driver, in order to compensate for the effect of centrifugal force, to tilt the body towards the inside of the curve until the median plane passing through the center of gravity is directed along the direction of the apparent vertical, that is to say, of the resultant of the gravity and the centrifugal force.

However, one cannot count solely upon the sense of balance of the driver, above all if the vehicle has a body, and for safety it is useful to have available a means enabling the body of the vehicle to be kept along the convenient tilt. In French Pat. No. 1,562,248 and its Addition No. 2,031,813 a certain number of means have been described enabling the articulation of the body to be blocked when the median plane of it tends to deviate from the direction of the apparent vertical. In the patent already quoted, the different means of control for maintaining the tilt of the body are operated by a pendular mass consisting either of a pendulum articulated onto the body or a rolling mass, for example, a ball capable of moving over a pan in the form of a cylindrical surface having an axis parallel with that of the articulation.

In these vehicles the stability depends obviously upon the sense of balance of the driver. Now that depends upon persons and may otherwise be disturbed by the fact that the vehicle has a body and hence has a weight necessarily higher than that of conventional two-wheeled vehicles and that furthermore it is more sensitive to sidewind.

SUMMARY OF THE INVENTION

The object of the invention is a new arrangement which enables one to be freed of the role of the driver in maintaining balance.

The device in accordance with the invention comprises means of rocking and of maintaining the tilt of the body, operated by a driving shaft driven in rotation by the movement of the vehicle and comprising a rocking mechanism capable of being driven in two opposite directions by said driving shaft by means of one or other of two disengageable coupling means which operate the rocking, each in one direction, and a means of progressive engagement of one or other of the said coupling means operated directly by the pendular mass, the deviation of the latter to one side or the other of the plane passing through its axis of oscillation and parallel with the median plane of the body operating the progressive engagement of that one of the two coupling means which causes the rocking of the body in the direction enabling the median plane of the latter to be brought back into the direction of the apparent vertical passing through the axis of oscillation and the center of gravity of the pendular mass.

In a preferred embodiment the driving shaft is driven in rotation at high speed and is connected to the rocking mechanism by way of a means of gearing down. Preferably the two disengageable couplings are keyed onto a secondary shaft for connection between the driving shaft and rocking mechanism, the said couplings being capable of driving the secondary shaft in two opposite directions of rotation which correspond each with one direction of rocking.

The means of progressive engagement of one or other of the couplings advantageously comprises a lever articulated at one end on to the pendular mass substantially at the center of gravity of it and at the other end onto a shaft integral with the body and located on the vertical through the said center of gravity when the pendular mass is at rest, the said lever operating the engagement of one or other of the coupling means by way of a force-multiplier system.

On the other hand in a more improved embodiment the device for operation of tilt comprises a means of anticipated operation of the deviation of the pendular mass to one side or the other of the median plane, capable of being actuated by the driver of the vehicle before the pendular mass is subjected to the effect of the centrifugal force.

Certain devices are already known in which the movement of a pendular mass operates the tilt of the body of a vehicle. Such devices are employed in particular in railway vehicles because it is not possible to give the railway tracks a sufficient cant to compensate entirely for the effect of the centrifugal force on the curves, taking into account the speed of the vehicles. In the known devices, however, the pendular mass does not operate directly the tilt of the vehicle but acts upon pneumatic, hydraulic, electric or electromechanical servo-motors by way of operating devices such as gates, slides, valves, solenoid valves or electrical contacts; the whole of these operating devices has a response time which is not negligble and/or a response curve which is often not linear. Further, these devices often have an all-or-nothing action which presents obvious disadvantages.

In the device in accordance with the invention, on the contrary, the centrifugal force being exerted on the pendular mass is employed directly for operating the orientation of the body. The rocking force is provided by a driving shaft which is driven by the means of movement of the vehicle. Thus one employs the fact that any vehicle in motion may have available a take-off of motion at high speed either directly from the engine or from the transmission between the engine and the axle so as to employ the kinetic energy of the engine or of the vehicle in motion. This shaft is normally driven in one uniform direction but may operate means of tilting in one direction or the other thanks to two disengageable couplings and the force of engagement is provided by the pendular mass, if necessary by way of a lever device. In that way, due to the progressiveness of the engagement a force may be provided for rocking the body, which is proportional to the deviation of the pendular mass. On the other hand the driving shaft supplies a relatively weak torque at the high speed of rotation which may be transformed, due to a heavy gearing down, into a high torque at a low speed of rotation capable of operating the rocking of the body into convenient conditions.

The invention will now be described by referring to a number of particular embodiments given by way of examples and represented in the drawings attached.

BRIEF DESCRIPTION OF THE DRAWINGS

FIG. 3 is a section along a vertical plane of section passing through the axis of articulation and marked B—B in FIGS. 1 and 2.

FIG. 4 is a partial section along a plane of section C—C in FIG. 1, which shows the assembly of levers associated with the pendular mass.

FIG. 6 represents in partial section along the axis of the secondary shaft, an embodiment of the disengageable couplings operated by magnetic powder clutches.

FIG. 7 represents diagrammatically in transverse section perpendicular to the axis of articulation, a more improved operating device.

FIG. 8 represents diagrammatically another improvement upon the invention.

DETAILED DESCRIPTION

The device in accordance with the invention is intended more especially, as has been indicated, for a stabilized three-wheeled vehicle of the type described in U.S. Pat. No. 3,698,502. Such a vehicle includes a body 1 articulated about an axis 21 onto the set of running wheels which support it. The set of running wheels includes a frame 31 which is supported by the axle 32 or any device equivalent to an axle, a bogey or pony-truck, independent wheels, etc., where the axis of the axle may be imaginary.

Figure 1:
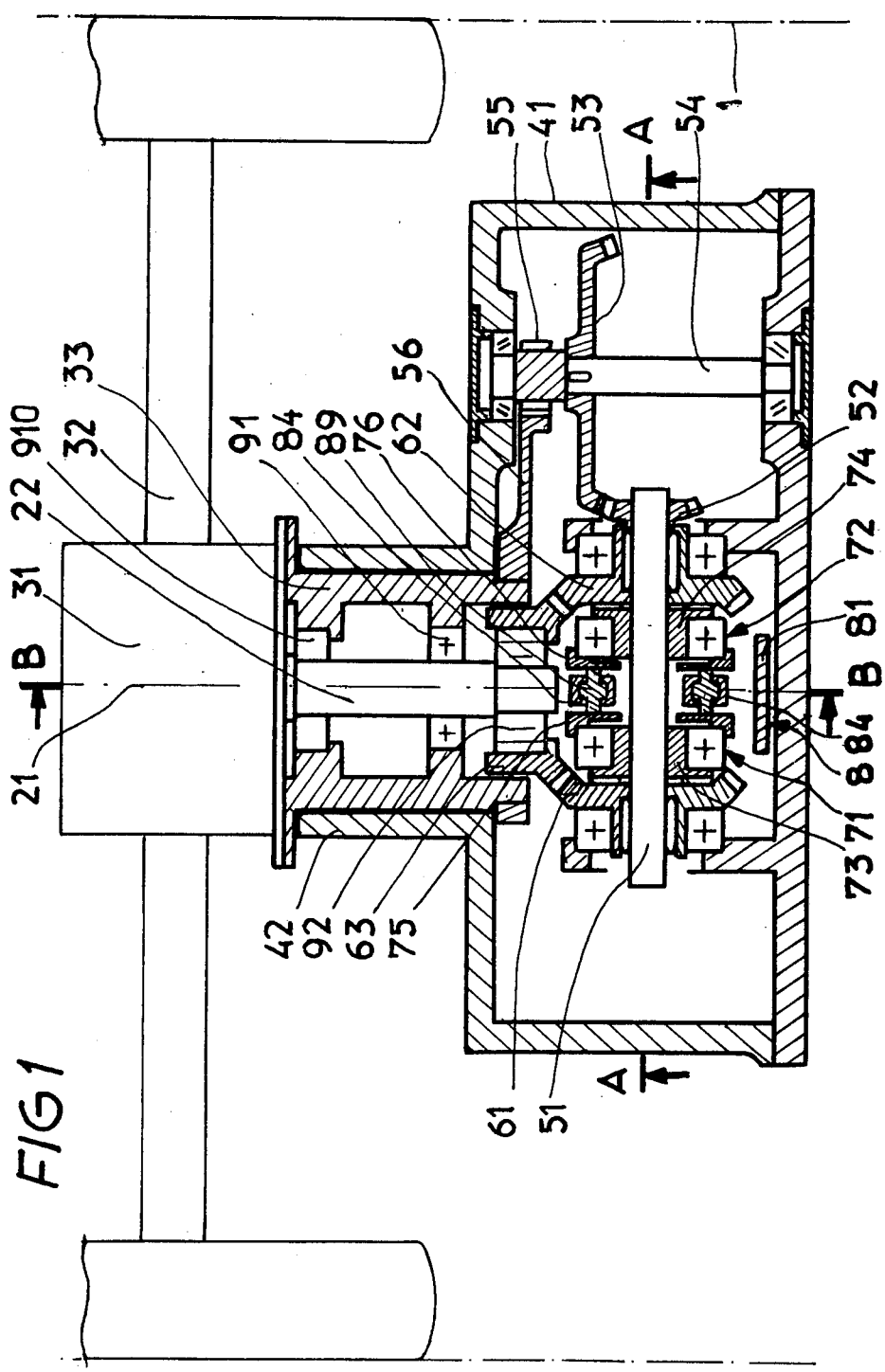
FIG. 1 is a section through the device along a horizontal plane passing through the axis of articulation of the body onto the set of running wheels.
Figure 2:
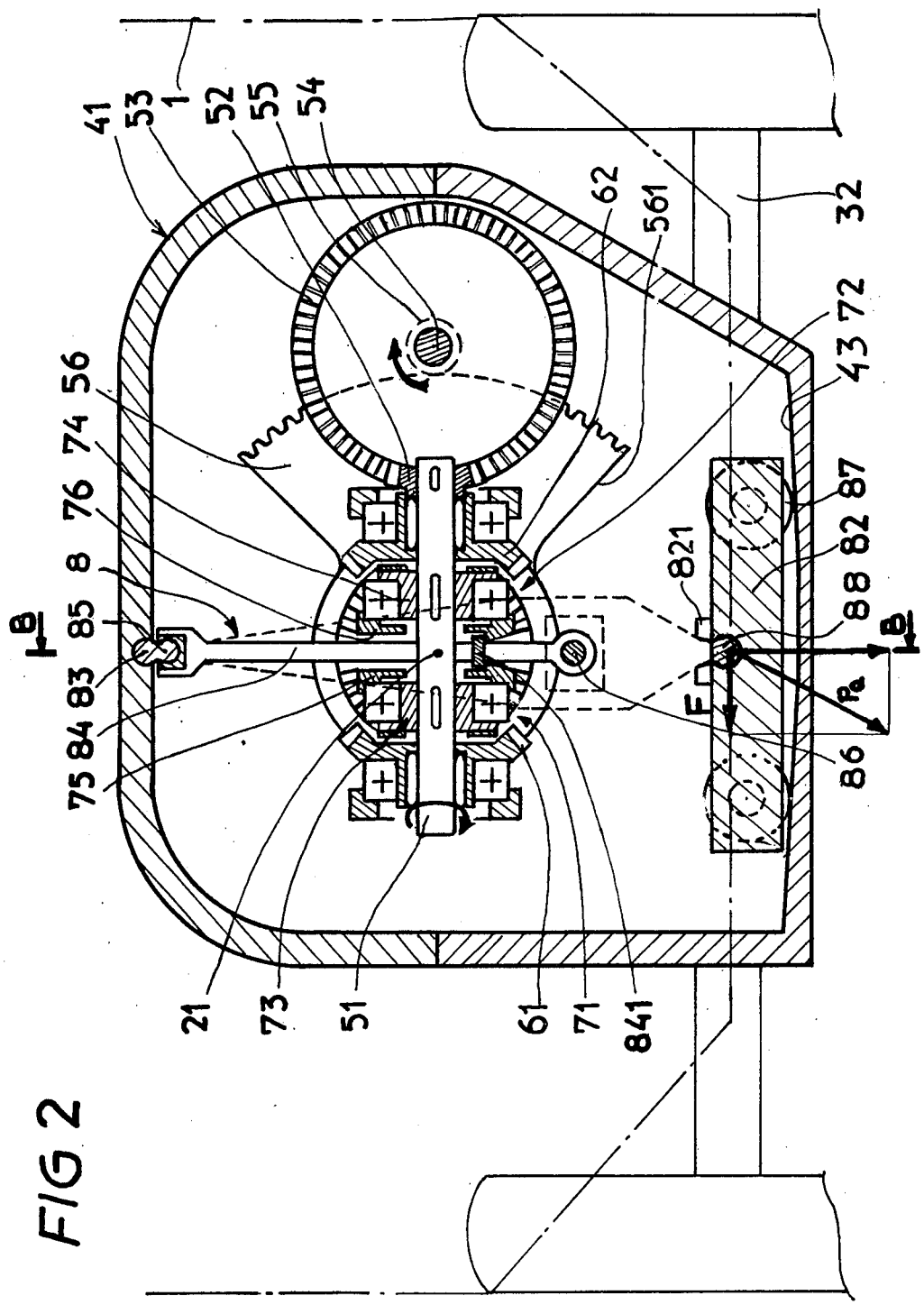
FIG. 2 is a section along a vertical plane of section perpendicular to the axis of articulation and marked A—A in FIG. 1.

The body 1 represented diagrammatically in dash-dot lines in FIG. 2, is integral with a casing 41 which is guided in rotation about the axis 21 with respect to the frame 31 and which is fixed longitudinally on this axis. For this purpose the casing 41 is integral with a sleeve 42 which includes an internal cylindrical bearing which cooperates with an outer cylindrical bearing integral with the frame 31.

In accordance with the invention the rocking of the body is operated by a driving shaft 22 which is driven at high speed and in a uniform direction either directly by the engine (not shown) or by the axle 32, for example, by means of a motion transmission device which might be located in the frame 31. The shaft 22 is carried by a bearing 91 mounted upon a part 33 prolonging the frame 31, upon which is arranged the cylindrical bearing for support of the sleeve 42.

The rocking of the body is operated by a mechanism which in the example represented consists of a pinion 55 carried by a shaft 54 mounted on the casing 41 and driven by the driving shaft 22 in one or other rocking direction, by way of a gearing-down system and two disengageable couplings, the said pinion 55 being in mesh with a gear 56 associated with the frame 31.

As may be seen in FIG. 2, the gear 56 may consist simply of a toothed sector subtending an angle greater than twice the maximum angle of tilt of the body and meshing in its plane of symmetry with the pinion 55 which is capable of being driven in the two directions of rotation by the driving shaft 22 by way of the gearing-down system. The latter consists of a set of gears and in the example represented in the Figures the pinion 55 is mounted on a shaft 54 parallel with the shaft 22, onto which is keyed a bevel gear 53 which meshes with a corresponding pinion 52 mounted at the end of a secondary shaft 51 mounted in the casing 41 and at right angles to the shaft 22.

The secondary shaft 51 is driven by the driving shaft 22 in the two directions of rotation by way of two disengageable couplings, which, as may be seen, enables the rotation of the pinion 55 to be operated in one direction or in the other and consequently the rocking of the body to one side or the other of the median plane.

The two disengageable couplings 71 and 72 are located on opposite sides of the center of the secondary shaft 51. Each coupling 71 (72) consists of a pinion 61 (62) mounted freely at one end of the shaft 51 and equipped with a friction lining which can cooperate with a clutch plate 73 (74) which is connected in rotation with the secondary shaft 51, for example, by means of splines which enable it to move axially along the said shaft.

The two pinions 61 and 62 are mounted upon bearings carried by the casing 41 and mesh on opposite sides with a pinion 63 driven in rotation by the shaft 22 so that the two pinions 61 and 62 turn in opposite directions. Hence it appears that in operating the engagement of one or other of the plates 73 and 74 with the corresponding pinion 61 or 62, the driving shaft 22 is enabled to drive the secondary shaft 51 in one direction or other of rotation. At rest, the clutches 73 and 74 being disengaged, the rotary motion of the driving shaft 22 is not transmitted to the secondary shaft 51.

In accordance with the invention the engagement of one or other of the two disengageable couplings 71, 72 is operated directly by the deviation of the pendular mass to one side or the other of the median plane. Thus the force of engagement is proportional to the deviation of the pendular mass and consequently to the rocking action necessary for compensating the centrifugal force.

It is preferable not to give the pendular mass sufficient weight for providing directly the force of engagement necessary, in order not to risk weighting the vehicle uselessly. That is why in accordance with the invention a force-multiplier system is employed which is represented diagrammatically in the Figures.

In order to increase the sensitivity of the pendular mass it is of interest to locate its axis of oscillation as far as possible from its center of gravity. For this purpose an imaginary axis of oscillation is employed, the pendular mass 82 rolling by means of rollers 87 upon a cylindrical surface 43 of large radius arranged in the bottom of the casing 41, the axis of which is located preferably in the median plane of the frame 1.

The movement of the pendular mass 82 is transformed into a force of engagement of one or other of the disengageable couplings by a set of levers 8 having a high multiplication ratio. In fact the pendular mass is articulated substantially at its center of gravity to the end of a primary lever 81 which at its other end is articulated onto the upper portion of the casing 41 about an axis 83 parallel with the axis of articulation 21 and located in the median plane of the body. The primary lever 81 likewise carries an axis of articulation 85 located at a short distance from the axis 83 and parallel with it, about which is articulated the top end of a secondary lever 84 which passes between the two clutch plates 73 and 74 and the bottom end of which is articulated onto the casing 41 about an axis 86 parallel with the axis of articulation 21 and located in the median plane of the body on the other side of the secondary shaft 51 with respect to the axis 85 and passing through a window arranged in the lever 81. Preferably the secondary lever 84 is composed of two arms passing on opposite sides of the secondary shaft 51.

As may be seen in FIG. 2, when the body 1 and consequently the casing 41 are orientated along the direction of the apparent vertical, the center of gravity of the mass 82 then lying in the median plane of the body, the axes 83, 85, 86 and 88 are aligned in the said median plane. The lever 84 is then located in the plane of symmetry of the secondary shaft 51, at equal distances from the two clutch plates 73 and 74.

When on the other hand the vehicle enters a curve, the mass 82 is subjected to a side force F due to the effect of centrifugal force and hence the axis 88 is moved towards the left in the Figure, carrying with it the primary lever 81 and consequently the axis 85 which in turn operates in the same direction the movement of the secondary lever 84 about the axis 86. Hence the secondary lever 84 will bear against the clutch plate located at the side towards which it is moved (73 in the Figure) and the plate being moved axially along the shaft 51 will be applied against the hub of the corresponding pinion (61) being driven in rotation by the shaft 22. The secondary shaft 51 is then driven in rotation in the same direction as the engaged pinion. Thus even if the pendular mass has a relatively low weight, its movement, due to the effect of the various lever arms of the assembly 8, causes a considerable force of engagement, proportional to the movement of the pendular mass, which above all is exerted progressively with the entry into the curve.

Of course the deviation of the levers causes slight variations in distance between the various axes 83, 85 and 86 but these may easily be absorbed by the clearances in the articulations.

In addition the secondary lever 84 advantageously bears against the two clutch plates by way of two collars, 75, 76 equipped with a system for taking up play. In fact, as may be seen in FIGS. 3 and 4, the secondary lever 84 is equipped with two weights 89 mounted to slide longitudinally each upon one of the arms of the lever, which under the action of their weight are applied between two sloping faces arranged on the two collars 75, 76 and forming a vee open upwards. The collars 75 and 76 bear against the plates 73 and 74 by way of rollers and they are prevented from turning by a crosspiece 841 which connects together the two arms of the lever 84 and against which bear steps integral with the collars.

The two weights 89 thus have the effect, thanks to their own weight, of taking up any play and they exert permanently a very slight force of approach of the clutch plates, which enables a response time to be obtained from the mechanism of practically zero, the lever 84 being ready to operate the sliding of one of the clutch plates as soon as the pendular mass 82 deviates to one side or the other.

Figure 5:
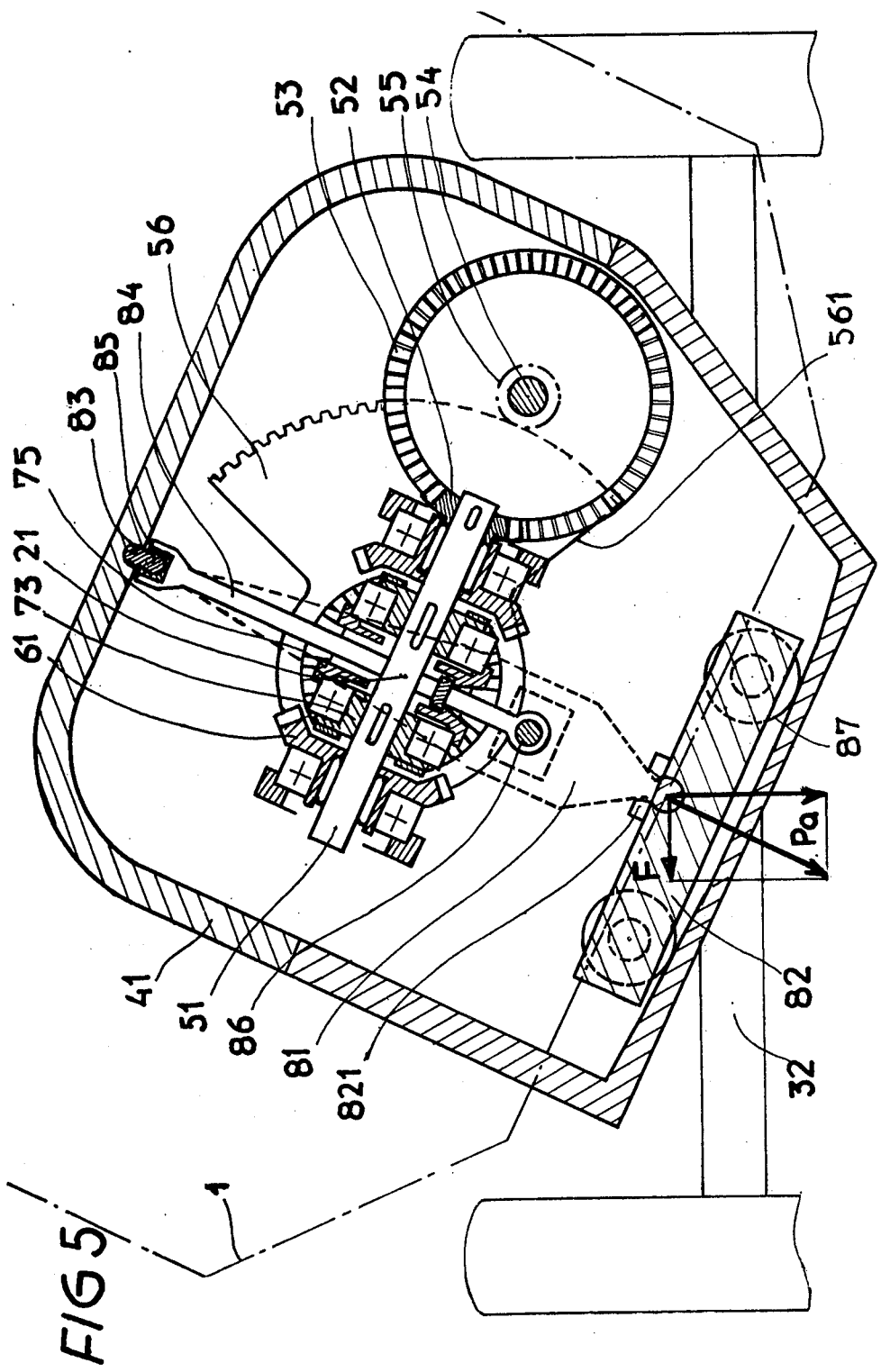
FIG. 5 is a section like FIG. 2, which represents the device when the body is tilted.

The operation of the device is understood easily by referring especially to FIGS. 2 and 5.

In FIG. 2 is represented the device on a straight line, the median plane B—B of the frame being perpendicular to the axis of the axle 32. Upon entering a curve the pendular mass 82 undergoes a side force F due to the centrifugal force which in the Figure is directed towards the left. The primary lever 81 turns about the axis 83 and carries along the axis 85 which in turn operates a slight rotation of the secondary lever 84 in the direction of the side force F. The lever 84 then operates the movement of the clutch 73 located at the same side and the latter operates progressively the engagement of the shaft 51 with the corresponding pinion 61 driven in rotation by the shaft 22.

By way of the gearing-down system consisting of the set of pinions 52, 53, the rotation of the shaft 51 in the direction of the pinion 61 operates the rotation of the pinion 55 with respect to the fixed toothed sector 56 and consequently the rocking of the body 1 in the direction which enables its median plane to be brought back into the direction of the apparent vertical which passes through the center of gravity of the pendular mass. The secondary lever 84 returns progressively into the plane of symmetry of the shaft 51 and hence operates progressive disengagement of the plate 73. Thanks to the effect of the clutches the rocking of the body and the keeping of it along the tilt of the apparent vertical can hence be obtained immediately and without jerking.

If the vehicle is stationary and the engine is running, the device automatically brings the body of the vehicle back to the vertical if it was tilted, for example, when stopping occurs on a curve.

When the engine is stopped, any tilt of the body causes a movement of the pendular mass 82 and consequently the engagement of the corresponding coupling which tends to cause the rotation of the driving shaft in the direction opposite to its normal direction of rotation. Having regard to the high ratio of gearing-down, the reverse torque exerted by the body shows as a very weak torque at the engine shaft 22 and this torque will not in general be capable of making the engine turn backwards. However, if there were any risk of this condition not being realized, an anti-reversal free wheel 910 might be placed on the driving shaft 22 to bear against the body, which would prevent the rotation of the shaft 22 in the direction which is the reverse of the normal direction.

The movement of tilting of the body must obviously be limited. For this purpose the pendular mass 82 is equipped with a stud 821. Two stops fixed with respect to the set of running wheels and symmetrical with respect to the vertical plane passing through the axis of articulation, may be provided for limiting the movements of the mass 82. One of these stops may be formed by the bottom face 561 of the fixed toothed sector 56, the other stop (not shown) then consisting of a symmetrical stop integral with this sector. These stops act upon the mass 82 in order to bring it back into the plane passing through the axes 83 and 86 and limit its action upon the clutches and consequently upon the tilting of the body.

Of course the invention may form the object of variants or improvements in detail. In certain cases, for example, it may be desirable that the device is irreversible. The reduction gear between the operating shaft 51 and the pinion 53 might then be of tangent screw type, for example. The axis of articulation of the double lever 84 might likewise be mounted on an eccentric in order to facilitate adjustments. In a general way, the assembly of force-multiplying levers might obviously be realized in a different way.

In addition, in the embodiment which has just been described, an entirely mechanical solution is employed. However, magnetic and hydraulic embodiments might equally well be employed.

In FIG. 6 is represented by way of example a magnetic embodiment of permanent-magnet type.

In this embodiment the secondary shaft 51 at the ends of which are likewise mounted the two pinions 61 and 62 driven by the driving shaft, is surrounded by a sleeve 100 of non-magnetic metal containing copper, for example, which is located between the two pinions 61 and 62 and which is connected in rotation to the shaft 51 by splines. In its central portion the sleeve 100 comprises an enlarged portion 101 of outer diameter d which is separated in two by a ring 103 of magnetic metal located in the plane of symmetry. Again, permanent magnets 102a 102b are inserted in the central portion 101 on opposite sides of the ring 103.

The two portions of smaller diameter 100a, 100b of the sleeve are surrounded each by a cylindrical ring consisting of an outer wall 104 of magnetic metal joined to an inner wall 105 of non-magnetic metal. The outer faces of the outer walls 104a, 104b have a diameter d and hence are found to be placed in prolongation of the outer face of the central portion 101 of the sleeve. The inner faces of the inner walls 105a, 105b are separated from the opposite faces of the portions 100a and 100b of the sleeve and thus create two annular cavities 106a, 106b which are filled with a soft iron powder in suspension in oil. Sealing devices not shown in the Figure are located along the plane faces in contact with the gears, the cylindrical parts and the sleeve, which hence may have rotary movements with respect to one another.

On the large-diameter central portion 101 of the sleeve and the cylindrical parts 104a, 104b which have the same outer diameter, can slide with very slight friction a ring 108 of magnetic metal equipped in its central portion with an annular groove 109 in which engage lugs 80 arranged upon two arms 8' of a lever framing the assembly and the movement of which towards the right or towards the left may be operated by the pendular mass in a fashion similar to that which has been described previously. In accordance with a variant, the ring 108 might have a weight sufficient for forming the pendular mass itself.

The ring 108 has a width equal to the thickness of the enlarged portion 101 of the sleeve so that when the system is in equilibrium, the lever 8' being in the median plane of the sleeve, the plane faces of the ring 108 are made flush at right angles to the plane faces of the large-diameter portion 101 of the sleeve.

Thus a powder clutch has been formed, the operation of which is known. Referring to FIG. 6, if the pendular mass moves the lever 8', for example, to one side or the other of the median plane, the lever 8' carries along the ring 108 which progressively covers over one of the two rings located on opposite sides of the central portion, for example, the ring 104a if the lever is moved towards the left. The lines of force of the magnets 102a may be closed by the gear 61, the outer portion 104a of the cylindrical part, the ring 108 and the ring 103. The iron powder in the cavity 106a is therefore magnetized and becomes viscous, thus driving the sleeve 100 in rotation in the same direction as the gear 61 which may progressively drive in rotation the shaft 51 thanks to the splines locking the sleeve to the shaft.

The shaft 51 then, as has been indicated previously, operates a tilting of the body which tends to bring the median plane of it back above the center of gravity of the pendular mass. The lever 8' returns progressively towards the right until in the position of equilibrium it locates itself in the plane of symmetry of the clutch. The lines of force can no longer be closed and consequently no torque is transmitted between the gearing and the shaft 51.

The employment of a powder clutch enables a rocking movement to be obtained which is particularly progressive and without jerking.

One might equally well conceive of devices in which the connection between the shaft 51 and the gears 61,62 would be ensured by little hydraulic couplers or eddy current plates, which are devices well known in themselves. Such devices, however, with respect to those which have just been described display the disadvantage of being purely dynamic and do not provide any restraining torque upon stopping, thus requiring complementary means which can complicate the device.

But the invention may equally well give rise to other improvements.

For example, if the main advantage of the invention lies in the fact that the movement of tilting of the body in order to bring it back into the plane of the apparent vertical is independent of the driver, it may however be desired that the driver have the possibility of acting upon the tilt himself. For this purpose a second free wheel 92 may be interposed between the driving shaft 22 and the gear 63 so that the latter can turn faster than the shaft 22 but not vice versa. In that way the driver might straighten up his vehicle himself if, for example, the body were tilted at standstill, the engine having been stopped before the system had had time to straighten up the body. Similarly the driver would have the possibility of slightly anticipating the action of centrifugal force causing the tilting movement of the body upon entering a curve, which would further reduce the time of response.

This anticipation would, however, be advantageously obtained by means of the improved device represented in FIG. 7.

In short, the human body displays over no matter what servo-mechanism the advantage of being able to foresee the movement and the invention thus improved enables this possibility to be employed.

For this purpose the pendular device for operation of the tilt is arranged so as to reflect upon the pendulum the action exerted by the driver in moving his center of gravity, which is the usual way of driving a two-wheeled vehicle.

In accordance with the invention the driver has the possibility of operating the deviation of the pendular mass to one side or the other of the median plane before the mass is subjected to the effect of the centrifugal force.

In the preferred embodiment represented in FIG. 7 the driver causes a deviation of the axis of oscillation of the pendular mass to the side of the median plane towards which the centrifugal force should be exerted later.

For this purpose the driver's seat 110 is articulated about a horizontal axis 111 located in the median plane of the vehicle and it is suspended by elastic means 112 which allow the rotation of the seat 110 about its axis 111 when the driver moves his center of gravity.

This rotation of the seat 110 causes a deviation of the axis of oscillation of the pendular mass in the opposite direction. When the latter consists of a pendulum, the axis of oscillation of the latter may be suspended from a part integral with the seat 110. It has been seen, however, that in order to increase the radius of the pendulum its axis of oscillation is imaginary, the pendular mass 82 being able to move over a cylindrical surface 410 of large radius.

In accordance with the improvement as FIG. 7, the cylindrical surface 410 is arranged on a plate 113 which can rock slightly with respect to the bottom of the casing 41 about an axis of articulation 114. The plate 113 is integral with an arm 115 which extends upwards from the axis 114 perpendicular to the plate and is equipped at its top end with a stud 116 for articulation which engages in a fork 117 integral with the driver's seat 110. It may be seen that the tilting of the seat in one direction or the other, for example, towards the right causes the tilting of the plate 113 and consequently the movement of the imaginary axis of articulation in the opposite direction, that is to say, towards the left, which acts upon the pendular mass as would a centrifugal force directed towards the left. As the natural movement of the driver is to lean his body towards the inside of the curve upon approaching it, this movement will therefore cause by anticipation the movement of the pendular mass towards the outside before the centrifugal force has appeared. This movement of the pendular mass causes the tilting of the body in the direction which has been caused in advance by the driver, which furthermore corresponds with a mode of driving natural with two-wheeled vehicles.

Blocking of the seat may possibly be effected either automatically when the speed drops below a given limit by means of an automatic system which likewise brings about blocking of the articulation, as has been described in the Patent already quoted, or at standstill by a device connected to the handbrake.

The invention may be further improved by a device which acts directly upon the pendular mass in order, for example, to correct the effect of sidewind which might have bad consequences upon a light vehicle. Such a device represented diagrammatically in FIG. 8 may consist very simply of a plate 120 forming a windvane attached to the outside of the casing 41 on an extension of the shaft 83 of the lever 81. A sideways flow of air of a certain strength acting by way of the plate 120 upon the orientation of the lever 81 acts like the pendular mass 82 and in a way moreover controlled by this mass in order to cause a tilting reaction of the vehicle in the opposite direction to the sidewind.

It will be observed that the simultaneous employment of a direct action upon the primary lever by the wind and upon the axis of oscillation by the driver makes these two actions absolutely independent of one another and consequently cumulative, which is obviously desirable.

Of course the invention is not restricted to the details of the embodiments which have been described only by way of examples and which might give rise to other improvements or to other variants by employing in particular equivalent means.

On the other hand, if the invention is applicable essentially to light three-wheeled vehicles it might equally well find application in larger vehicles for which it may be equally interesting to operate the tilting of the vehicle directly by the pendular mass and from a driving shaft driven by the kinetic energy of the engine or of the vehicle itself.

I claim:

1. A device for operation and control of the tilt of an articulated vehicle driven by a motor and comprising a body, a front guide wheel and a set of running wheels carried by an articulated chassis on the body around a substantially horizontal articulation axis and located in the median plane passing through the center of gravity of said body, by means of a support piece integral with said chassis and on which is provided an exterior cylindrical support cooperating with an interior cylindrical support provided on a housing integral with said body, said device for controlling tilt comprising a drive shaft rotating in a bearing carried by said support piece integral with said chassis and rotated at high speed in a uniform direction, a gear fixed to said chassis, a pendular mass mounted to oscillate on said body around an axis when subjected to centrifugal force, a rocking mechanism supported on said fixed gear and driven by said drive shaft, said rocking mechanism being mounted on said housing integral with said body and comprising: a driving pinion rotatably connected to said drive shaft through the intermediary of a free wheel permitting said driving pinion to turn faster than said drive shaft; a secondary shaft adapted to be rotatably driven in two directions by said driving pinion responsive to two disengageable coupling means, each comprising a gear loosely mounted on said housing and means for progressive engagement of said gear with said secondary shaft, said gears being driven in rotation in opposite directions by said driving pinion; a gearing down system of an assembly of gears interposed between a pinion supported on said secondary drive shaft and a pinion in mesh with said gear fixed to said chassis; and a force-multiplier system actuated by said pendular mass to control the progressive engagement with said secondary drive shaft of one of two gears capable of operating the rotation of said rocking mechanism in the direction enabling a median plane of the latter to be brought back parallel to the direction passing through the axis of oscillation and the center of gravity of said pendular mass.

2. A device for operation of tilt according to claim 1, wherein: the drive shaft is driven by the engine for movement of the vehicle.

3. A device for operation of tilt according to claim 1, wherein: the drive shaft is driven by the kinetic energy of the vehicle being transmitted from the set of running wheels.

4. A device for operation of tilt according to claim 1, wherein: said gear fixed to said chassis is a toothed sector subtending at an angle greater than twice the maximum angle of tilt of the body and meshing in its plane of symmetry with a pinion of the gearing down system.

5. A device for operation of tilt according to claim 1, wherein: the two pinions mounted on the housing are centered on the secondary shaft, the latter being perpendicular to the median plane of the body and each cooperating with a clutch keyed onto the secondary drive shaft and capable of being locked in rotation with the corresponding pinion.

6. A device for operation of tilt according to claim 5, wherein: the force-multiplier system comprises, a primary lever articulated at one end onto the pendular mass substantially at the center of gravity of the latter and at the other end, onto an axle integral with the body and located on the vertical through the said center of gravity when the pendular mass is at rest, a secondary lever aligned with the first lever in a position of rest, said secondary lever being articulated on the body at its end toward the side of the mass and the primary lever at its end toward the axis of articulation of said primary lever, a secondary lever passing between the two clutches, the latter being located between the free pinion on both sides of the plane of symmetry of the mechanism, said secondary lever, by bearing to one side or the other, causing a force of engagement proportional to the deviation of the pendular mass to the same side from a position of rest.

7. A device for operation of tilt according to claim 6, wherein: each clutch comprises a plate integral in rotation with the secondary shaft and capable of being displaced axially along said shaft between the two free pinions, each plate cooperating with a clutch lining arranged on the corresponding pinion, the said plates being separated by a gap through which passes the secondary lever and exhibiting towards the inside two sloping faces forming a vee, the secondary lever consisting of two arms which frame the secondary shaft and upon which two bearing-weights are mounted to be able to slide and capable of becoming applied between the said vee-faces so as to form a system for taking up play.

8. A device for operation of tilt according to claim 6, wherein: the clutches cooperating with the two free pinions are two magnetic powder clutches located between said pinions on opposite sides of the central portion which is enlarged by a sleeve of non-magnetic metal threaded onto the secondary shaft and driven in rotation by it and in which are inserted permanent magnets on opposite sides of a central ring of magnetic metal which cuts the said central portion into two symmetrical portions, each clutch comprising an annular cavity filled with magnetic metal powder, bounded transversely by the hub of the corresponding pinion and by the transverse wall of the central portion of the sleeve and radially towards the inside by a cylindrical wall prolonging the central portion of the sleeve up to the pinion and towards the outside by a cylindrical collar formed of an inner wall of non-magnetic metal covered by an outer wall of magnetic metal the outer cylindrical face of which has a diameter equal to that of the cylindrical sidewall of the central portion of the sleeve, the said cylindrical sidewall being covered by a collar of magnetic metal capable of sliding with light friction under the action of the centrifugal force over the outer faces of the central portion of the sleeve and of the outer magnetic walls of the two collars bounding the two annular cavities, the said magnetic collar in the position of rest covering exactly the enlarged central portion of the sleeve so that its transverse faces are flush with the prolongation of those of the enlarged portion, and the said collar being able under the action of the centrifugal force to cover over to a greater or less degree the magnetic wall of the clutch located at the side towards which the centrifugal force is being exerted without going beyond the plane of the central magnetic ring, so as to enable closure of the lines of force and consequently progressive engagement of the corresponding pinion.

9. A device for operation of tilt according to claim 6, wherein: it comprises a device for correction of sidewind defined by a plate forming a windvane located outside the casing containing the mechanism and capable of operating an orientation of the primary lever to enable a tilting reaction of the vehicle in a direction opposite to the sidewind.

10. A device for operation of tilt according to any one of claims 1 through 8, wherein: there is provided a means of anticipated operation of the deviation of the pendular mass to one side or the other of the median plane, capable of being actuated by the driver of the vehicle before the pendular mass is subjected to the effect of the centrifugal force.

11. A device for operation of tilt according to claim 10, wherein: the means of anticipated operation causes a deviation of the axis of oscillation of the pendular mass to the side of the median plane toward which the centrifugal force is eventually exerted.

12. A device for operation of tilt according to claim 11, wherein: the means of anticipated operation is actuated by the seat of the driver of the vehicle, said seat being suspended in an articulated manner about a longitudinal horizontal axis, said means of operation causing the deviation of the pendular mass to one side of the median plane each time the driver tilts his seat to the opposite side.

13. A device for operation of tilt according to claim 11, comprising: a cylindrical pan having a horizontal axis parallel to the median plane, arranged on a part articulated about a parallel axis located in the vertical plane passing through the axis of the pan and close to the latter, said pendular mass being provided with means for rolling across said pan, and said means of anticipated operation being constituted by means for controlling the tilt of said articulated pan toward the side opposite to that toward which the seat is tilted.

* * * * *